(12) United States Patent
Pieri (10) Patent No.: US 10,619,502 B2
(45) Date of Patent: Apr. 14, 2020

(54) SLIP RING EXPANSION JOINT

(71) Applicant: Nuovo Pignone Tecnologie Srl, Florence (IT)

(72) Inventor: Marco Pieri, Florence (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 62 days.

(21) Appl. No.: 15/843,336

(22) Filed: Dec. 15, 2017

(65) Prior Publication Data

US 2018/0171813 A1 Jun. 21, 2018

(30) Foreign Application Priority Data

Dec. 15, 2016 (IT) .......................... 102016000126878

(51) Int. Cl.
| | | |
|---|---|---|
| *F01D 11/00* | (2006.01) | |
| *F01D 11/10* | (2006.01) | |
| *F16L 27/12* | (2006.01) | |
| *F16L 51/00* | (2006.01) | |

(52) U.S. Cl.
CPC .......... *F01D 11/005* (2013.01); *F01D 11/003* (2013.01); *F01D 11/10* (2013.01); *F16L 27/12* (2013.01); *F16L 51/00* (2013.01)

(58) Field of Classification Search
CPC ...... F01D 11/003; F01D 11/005; F01D 11/10; F16L 27/12; F16L 51/00
See application file for complete search history.

(56) References Cited

U.S. PATENT DOCUMENTS

| | | | | |
|---|---|---|---|---|
| 2,863,632 A | | 12/1958 | Miller | |
| 4,566,704 A | * | 1/1986 | van Dongeren | .... B29C 45/1676 277/624 |
| 4,702,671 A | * | 10/1987 | Brinkman | ............. F01D 11/005 277/606 |

(Continued)

FOREIGN PATENT DOCUMENTS

| | | |
|---|---|---|
| DE | 20 2014 006031 U1 | 10/2015 |
| NL | 8 500 899 A | 7/1985 |
| WO | 2016/008557 A1 | 1/2016 |

OTHER PUBLICATIONS

Italian Search Report and Written Opinion issued in connection with corresponding IT Application No. IT201600126878 dated Jun. 26, 2017.

(Continued)

*Primary Examiner* — Igor Kershteyn
(74) *Attorney, Agent, or Firm* — Baker Hughes Patent Organization (57) ABSTRACT

An expansion joint for sealingly connecting a first and a second turbine component having wall openings coaxial with fluid passages in relative displacement, the openings defining a recess with opposing axial surfaces acting as seat for the joint in the first and the second turbine component, the joint comprising a sealing ring adapted to be disposed in the recess such as to axially and radially engage with the recess surfaces around the fluid passages, an intermediate ring adapted for being interposed between the sealing ring and the radial surface of the first turbine component, wherein the intermediate ring has openings axially engaging with protuberances of the sealing ring to prevent relative rotation.

14 Claims, 11 Drawing Sheets

(56) References Cited

U.S. PATENT DOCUMENTS

| | | | |
|---|---|---|---|
| 8,196,934 B2* | 6/2012 | Do | F01D 11/005 |
| | | | 277/422 |
| 9,677,411 B2* | 6/2017 | Nakazawa | F01D 11/005 |
| 2011/0227296 A1 | 9/2011 | Baca | |

OTHER PUBLICATIONS

Extended European Search Report and Opinion issued in connection with corresponding EP Application No. 17205621.0 dated Mar. 16, 2018.

* cited by examiner

Section K-K

Section M-M

SLIP RING EXPANSION JOINT

TECHNICAL FIELD

Embodiments of the subject matter disclosed herein relate to expansion joints for sealingly connecting two turbine components the coaxial interfaces of which are in relative displacement, and methods for connecting turbine components.

BACKGROUND

In steam turbines, steam is used as flow medium which can have a temperature of over 600° C. at a pressure of over 300 bar. Such high temperatures and pressures make increased demands upon the materials of the steam turbine. In particular, the region of the steam admission is thermally and mechanically highly stressed.

A steam turbine customarily has an inner casing, an outer casing which is arranged around the inner casing, and a rotor which is rotatably mounted inside the inner casing. The live steam flows through the outer casing and the inner casing into a flow passage to reach the rotor. The coaxial interface regions between the casings are thermally highly stressed and in relative displacement.

Figure 1:
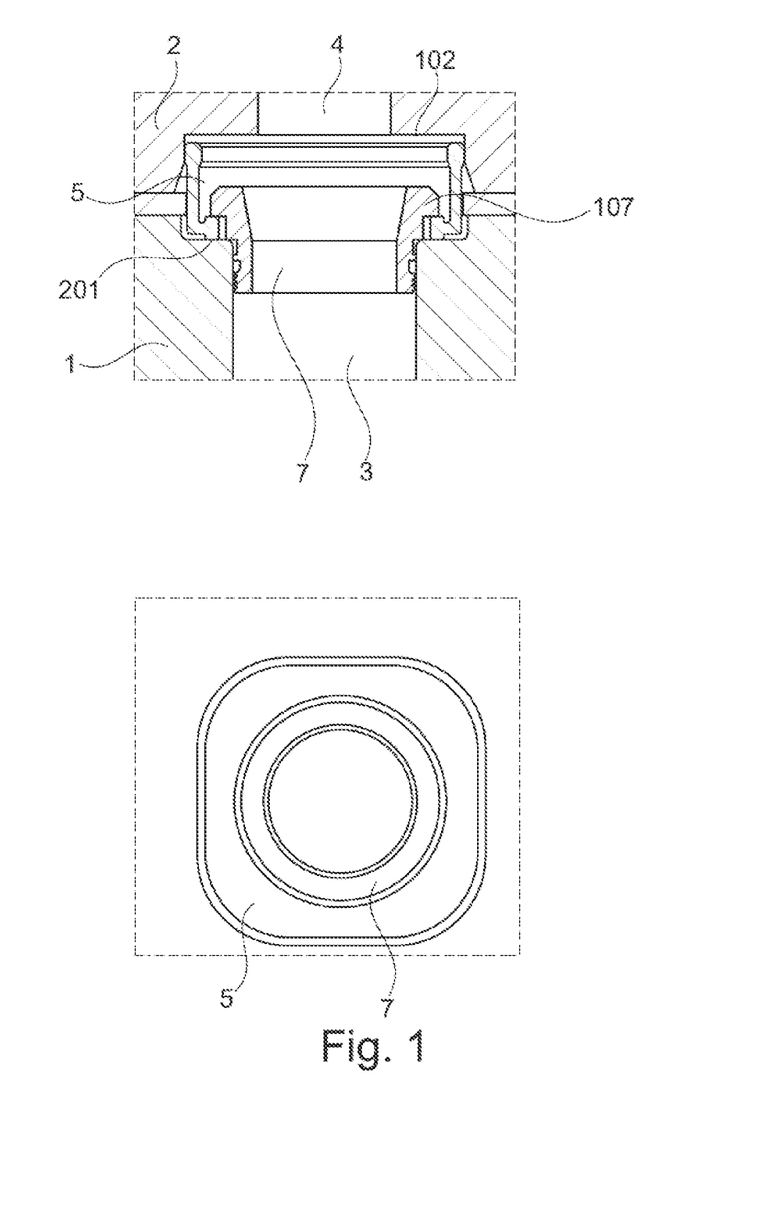
FIG. 1 shows section views of an expansion joint with a squared seat according to the state of the art.

To accommodate differential thermal expansion of the casings while substantially preventing the leakage of high pressure steam therebetween it is common practice to provide a slip-type expansion joint of the type shown in FIG. 1.

The internal and external casings 1, 2 have wall openings, coaxial with corresponding fluid passages 3, 4, defining a cylindrical recess with opposing axial surfaces 102, 201 acting as seat for the joint. A sealing ring 5 is disposed in the recess such as to axially and radially engage with the recesses 102, 201 around the fluid passages 3, 4. A bushing 7 is tightened in the inner casing 1 to form an abutting conduit having a retaining ring 107 axially blocking the sealing ring 5.

Figure 2A:
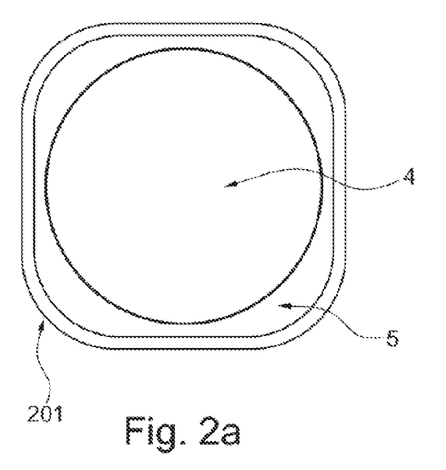
FIG. 2*a* shows an ideal case where the sealing ring is uniformly spaced from the seat.

Due to unsteady operation characterized by high pressure and high temperature gradient, causing differential thermal expansion and contraction and strong turbulent vibrations, the interfaces between the casings are in relative displacement when in use. To prevent rotation, the seat 201 on the inner casing 1 has a shape mating a corresponding section of the sealing ring 5. As shown in FIG. 2*a*. In operation, due to high temperature, high pressure, high velocity and turbulence of the steam, the sealing ring tends to vibrate and rotate. This determines a non perfectly uniform gap 401 between the seat and the ring as shown by the arrows in FIG. 2*b* causing a lateral wear of the seat in those zones 401 having reduced clearance (see FIG. 2*c*). This solution is thus non robust with respect to rotation.

An alternative to a squared seat joint is the device disclosed in U.S. Pat. No. 2,863,632. The slip ring expansion joint of this document is, however, rather complex and expensive as it requires a multiple ring pack configuration.

Therefore there is a need for an expansion joint for sealingly connecting two turbine components that is robust to anti-rotation behavior and at the same time simple, inexpensive and ease of installation also to retrofit existing/damaged units.

BRIEF DESCRIPTION OF THE INVENTION

According to first exemplary embodiments, there is an expansion joint for sealingly connecting a first and a second turbine component having wall openings coaxial with fluid passages in relative displacement, the openings defining a recess with opposing axial surfaces acting as seat for the joint in the first and the second turbine component, the joint comprising:

a sealing ring adapted to be disposed in the recess such as to axially and radially engage with the recessed surfaces around the fluid passages, an intermediate ring adapted for being interposed between the sealing ring and the recessed surface of the first turbine component, wherein the intermediate ring has openings axially engaging with protuberances of the sealing ring to prevent relative rotation.

According to second exemplary embodiments, there is a method for sealingly connecting a first and a second turbine component.

The turbine components, such as the inner and external casings of a turbine, have wall openings defining recesses coaxial with fluid passages in relative displacement. The recess of the first turbine component has the shape of a cylindrical bore with a circular bottom surface, while the recess of the second turbine component has the shape of coaxial cylindrical bores with the internal bore having a diameter less than the diameter of the external bore so as to define a bottom circular surface and an intermediate annular surface.

Specifically the method comprises the operations of:

tightening a threaded intermediate ring, having a flanged end portion and circumferential openings, on the lateral wall of the internal bore of the first turbine component until the flanged end portion of the intermediate ring is positioned on the intermediate annular surface of the first turbine component;

placing on the flanged end portion a sealing ring having circumferential abutting elements in the axial direction so as to engage with the circumferential openings of the intermediate ring to prevent relative rotation of the sealing ring with respect to the intermediate ring.

The introduction of an intermediate ring between the sealing ring and the internal casing avoids the direct contact of the sealing ring with the inner casing and thus the sliding and grinding of the ring on the seat thus preserving joint integrity. Furthermore the circular symmetry of the sealing ring with normal direction blocking surfaces eliminate the need of a squared seat causing non-uniform lateral wear thus leading to a very compact, robust and highly serviceable device.

BRIEF DESCRIPTION OF THE DRAWINGS

These and other features, aspects, and advantages of the subject matter of this disclosure will become better understood when the following detailed description is read with reference to the accompanying drawings in which like characters represent like parts throughout the drawings, wherein:

FIGS. 2*a*, 2*b*, and 2*c* show an exemplary sketch to show non-uniform lateral wear of the squared seat of FIG. 1.

FIGS. 3*a*, 3*b*, and 3*c* show an exemplary sketch to show improvements according to embodiments herein.

DETAILED DESCRIPTION OF THE INVENTION

Figure 4:
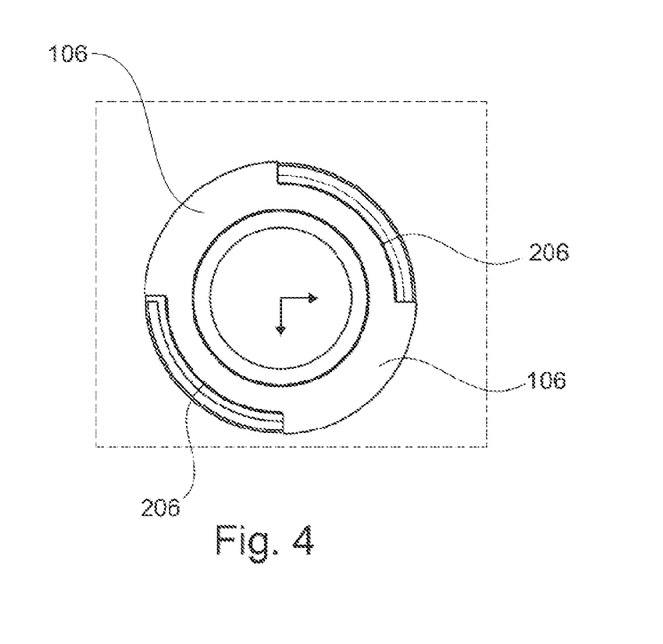
FIG. 4 shows section views of an expansion joint according to an exemplary embodiment.

The following disclosure describes in detail various embodiments of an expansion joint for sealingly connecting two turbine components the coaxial interfaces of which are in relative displacement. In FIG. 4 a cross-sectional view of an expansion joint according to an embodiment is shown in a mounted condition to connect two turbine components 1, 2. The turbine components, such as the inner and external casings of a turbine, have wall openings defining recesses coaxial with fluid passages 3, 4. Due to unsteady operation characterized by high pressure and high temperature gradient, causing differential thermal expansion and contraction and strong turbulent vibrations, the interfaces between the two turbine components are in relative displacement when in use. The recess of the second turbine component 2 has the shape of a cylindrical bore with a circular bottom surface 102, while the recess of the first turbine component 1 has the shape of two coaxial cylindrical bores with the internal bore having a diameter less than the diameter of the external bore so as to define a bottom circular surface 101 and an intermediate annular surface 201.

The joint comprises a sealing ring 5 disposed in the recess such as to axially and radially engage with the recessed surface 201 of turbine component 1. The contact of the sealing ring 5 and the surface 201 is however not direct, but with interposition of an intermediate ring 6 typically of material harder than the turbine component 1.

Figure 5A:
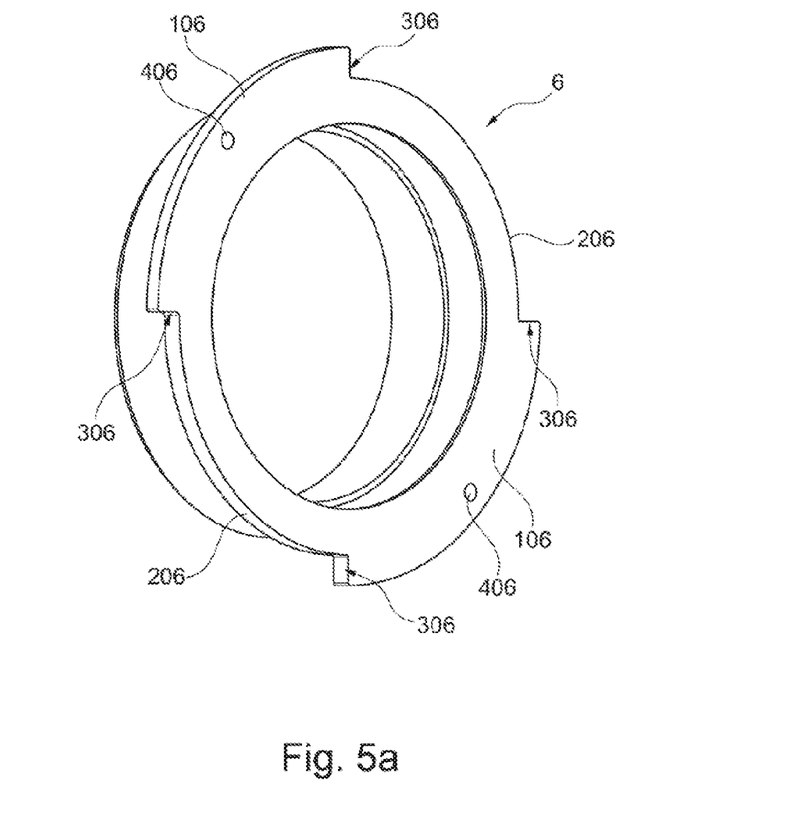
FIGS. 5a, 5b, and 5c show a tridimensional view (FIG. 5a), a view from below (FIG. 5b) and a lateral section view (FIG. 5c) of an intermediate ring according to embodiments herein.
Figure 5B:
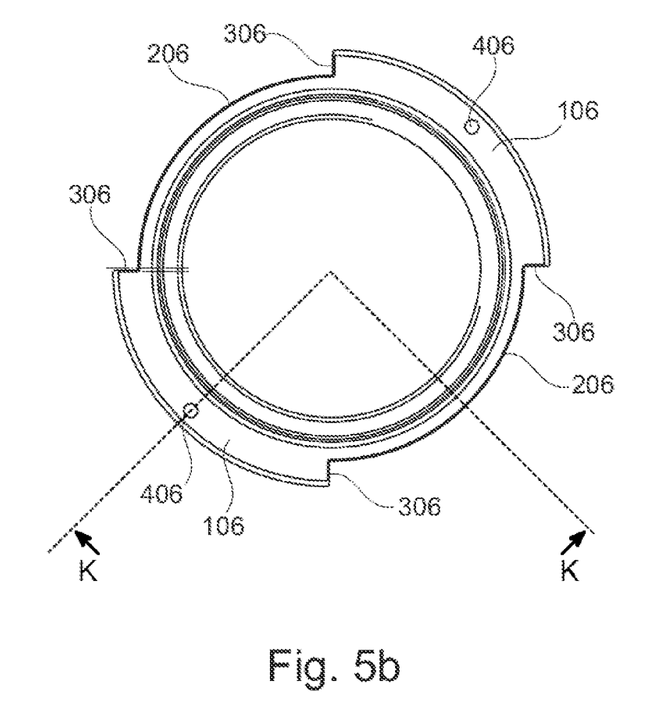
Figure 5C:
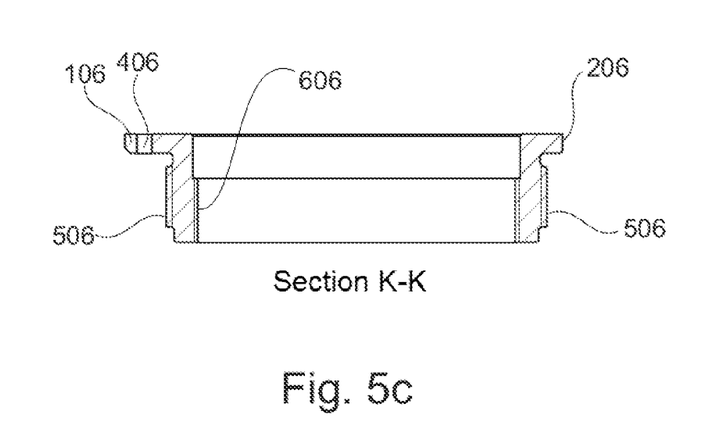

As better shown in FIG. 5a, FIG. 5b, and FIG. 5c, to achieve a good fixing on the turbine component 1, the intermediate ring 6 has the shape of a threaded cylinder 506 with a flanged end portion 106 acting like a bushing which is tightened on the lateral wall 301 of the internal bore of turbine component 1 until the flanged end portion 106 rests on the intermediate surface 201. The lateral wall axially aligns with fluid passage 3. The intermediate ring 6 has openings in the flanged end portion 106. In the embodiment shown, the openings are in the form of two symmetrical circumferential slots 206 delimited by axial lateral surfaces 306, but obviously they can be of any type, number and disposition as long as the sealing ring 5 has corresponding protrusions engaging to block relative rotation.

Pilot holes 406 in the flanged end portion 106 are provided for fixing the intermediate ring 6 to the turbine component 1 for example with pins.

Figure 6A:
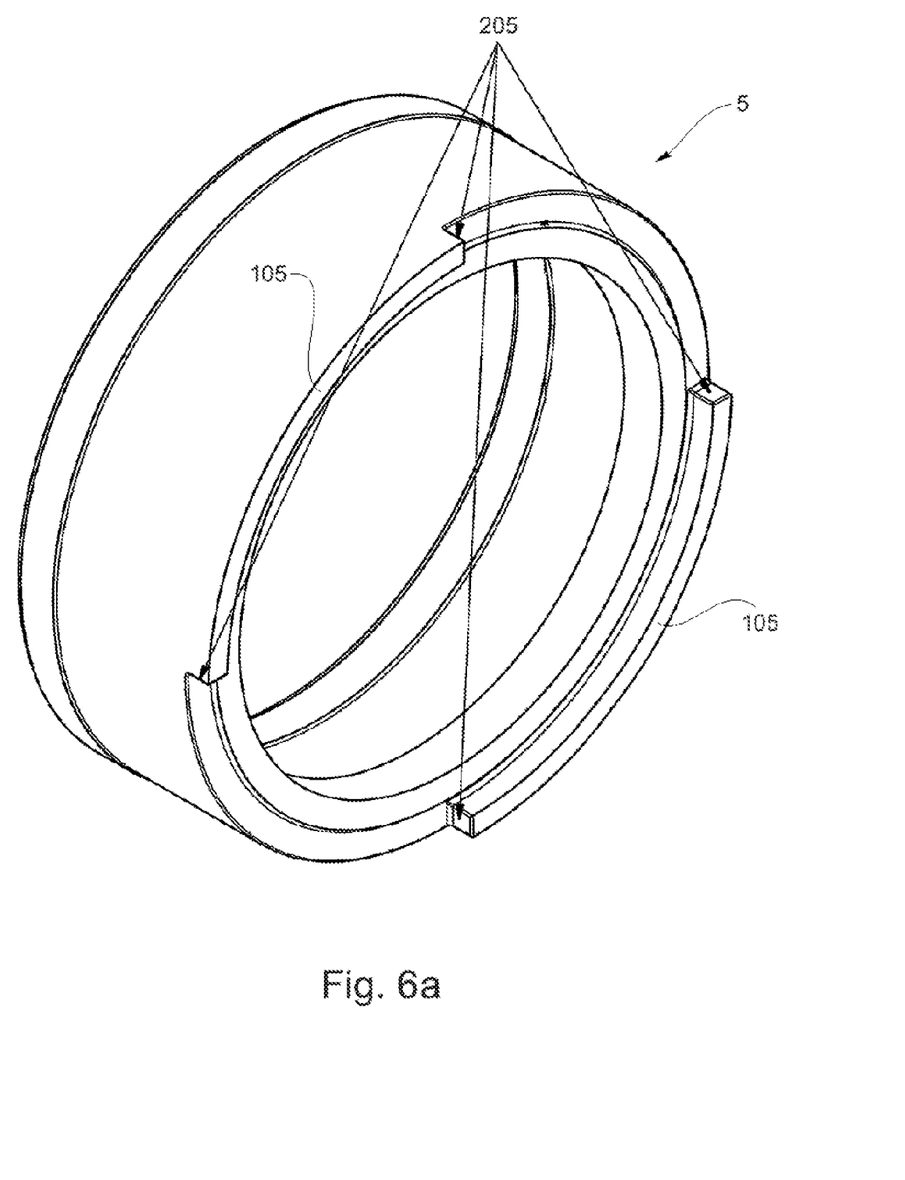
FIGS. 6a, 6b, and 6c show a tridimensional view (FIG. 6a), a view from below (FIG. 6b) and a lateral section view (FIG. 6c) of a sealing ring according to embodiments herein.
Figure 6B:
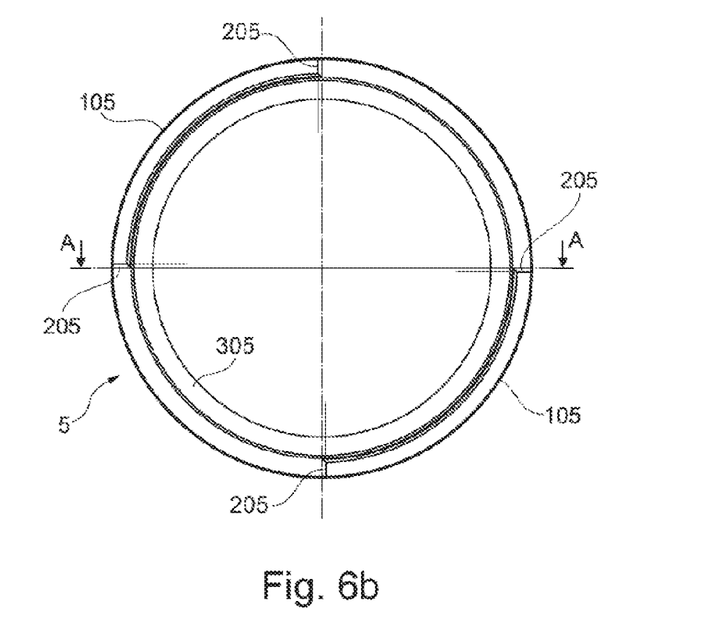
Figure 6C:
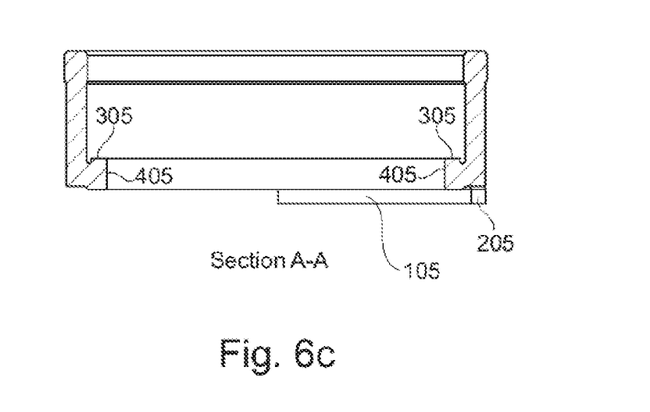

FIG. 6a, FIG. 6b, and FIG. 6c show the sealing ring 5 in the form of a cylinder with, on one end, circumferential protuberances 105 having axial lateral surfaces 205 complementary to the axial lateral surfaces of the intermediate ring 6.

Upon assembling the joint, the sealing ring 5 is placed on the flanged end portion 106 of the intermediate ring 6 with the circumferential abutting protuberances 105 axially engaging with the circumferential openings 206 of the intermediate ring 6 to prevent relative rotation of the sealing ring 5 with respect to the intermediate ring 6.

A radial clearance 401, 402 exists between the sealing ring 5 and the lateral walls of said first component defining the recess receiving the sealing ring 5 in turbine component 1 to allow the sealing ring 5 to slip in the joint seat. Said clearance 401, 402 is needed for assembly purposes and for allowing thermal expansion of the parts in contact.

A bushing element 7 is provided to engage with the lateral wall of the intermediate ring 6 to form a tronco-conical abutting conduit in fluid communication with flow passage 3. The bushing element 7 has a radial abutting surface 107 acting on an indented annular surface 305 of the sealing ring 5 such as to exert a retaining function on the terminal portion 405 of the sealing ring 5 towards the intermediate ring 6.

Fixing elements are provided for securing the bushing element 7 to the intermediate ring 6. In the embodiment shown in FIG. 7a and FIGS. 7b, the fixing elements comprise pins to be inserted in pilot holes 207 provided at the periphery of the bushing element 7 to secure the bushing element 7 to the intermediate ring 6 and threads 307, 606 to tighten the bushing element 7 to the intermediate ring 6.

The introduction of the intermediate ring between the threaded bush and the inner casing avoids direct contact of the sealing ring with the inner casing. Furthermore it prevents the sealing ring to rotate since the conventional sliding contact interface on the squared seat is replaced with the normal contact interface on the intermediate ring, which comes with hardened surfaces to limit the wear of components.

Figure 2B:
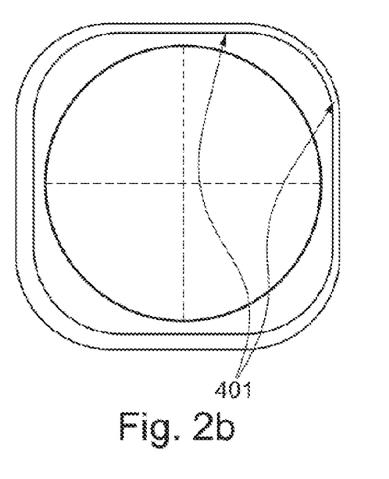
FIG. 2*b* shows a real case where the gap between the seat and the sealing ring is not uniformly distributed.
Figure 2C:
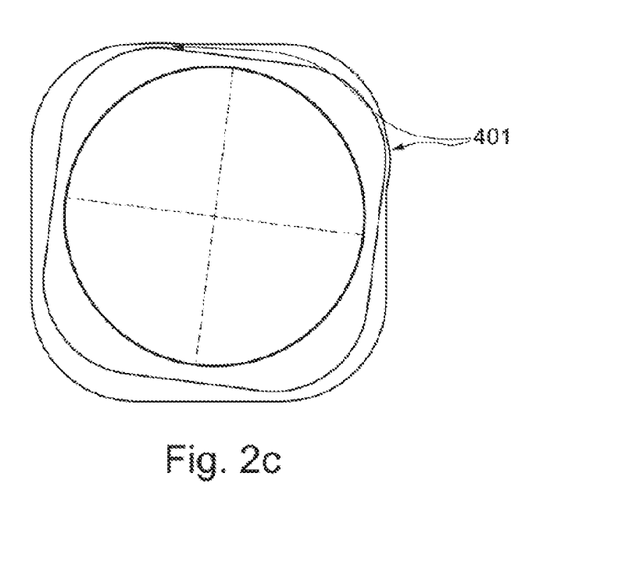
FIG. 2*c* shows zones of contacts and thus wear between the sealing ring and the seat caused by rotation.
Figure 3A:
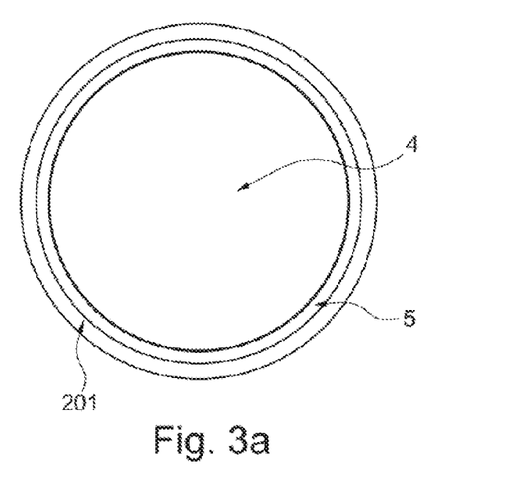
FIG. 3*a* shows an ideal case where the circular sealing ring is uniformly spaced from the circular seat.
Figure 3B:
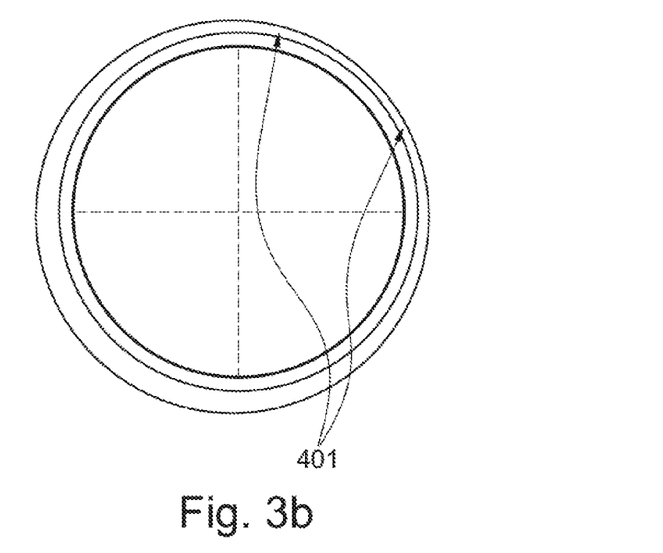
FIG. 3b shows a real case where the gap between the seat and the sealing ring is not uniformly distributed.
Figure 3C:
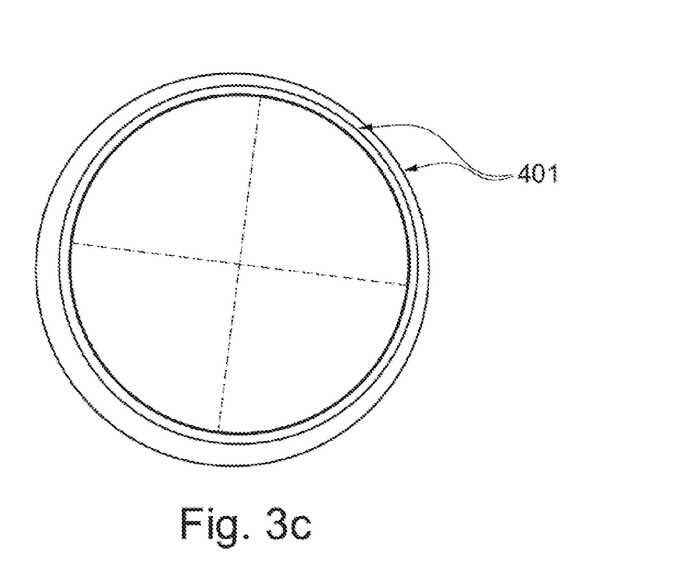
FIG. 3c shows that zones of contacts and thus wear between the sealing ring and the seat do not occur due to circular symmetry even in case of rotation of the sealing ring.

Usage of circular seat instead of a squared seat is particularly advantageous. This can be appreciated by looking at the sketches of FIGS. 3a, 3b, and 3c. FIG. 3a shows an ideal case where the circular sealing ring 5 is uniformly spaced from the circular seat 201. FIG. 3b shows a real case where the gap 401 between the seat 201 and the sealing ring 5 is not uniformly distributed due to position tolerance and to the effect of relative displacement of components during operation. FIG. 3c shows that zones of contacts and thus wear between the sealing ring and the seat do not occur due to circular symmetry. On the contrary, on squared seats as shown in FIG. 2a, FIG. 2b, and FIG. 2c, a slight difference in the gap 401 is enough for causing points of contacts leading to lateral wear even at small rotation angles.

To assemble the joint, an embodiment provides for:

tightening a threaded intermediate ring, having a flanged end portion and circumferential openings, on the lateral wall of the internal bore of the first turbine component until the flanged end portion of the intermediate ring is positioned on the intermediate annular surface of the first turbine component;

placing on the flanged end portion a sealing ring having circumferential abutting elements in the axial direction so as to engage with the circumferential openings of the intermediate ring to prevent relative rotation of the sealing ring with respect to the intermediate ring;

tightening a bushing element on the lateral wall of the intermediate ring facing the internal bore to form an abutting conduit in fluid communication with the flow passage of the first turbine component.

The operation of tightening the bushing element comprises pushing a radially abutting surface of the bushing element towards an annular surface of the sealing ring to retain the sealing ring towards the flanged end portion of the intermediate ring.

Before placing the sealing ring on the flanged end portion of the intermediate ring, the intermediate ring can be secured to the first turbine component by:

drilling bores on the intermediate annular surface of the first turbine component in correspondence with pilot holes 406 provided on the flanged end portion of the intermediate ring;

inserting pins in the pilot holes 406 and the bores as drilled to secure the flanged end portion to the intermediate annular surface of the first turbine component.

Figure 7A:
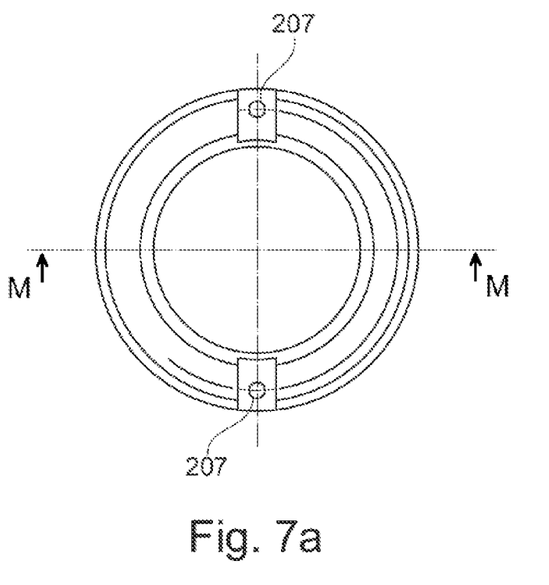
FIGS. 7a and 7b show a view from above (FIG. 7a) and a lateral section view (FIG. 7b) of a bushing according to embodiments herein.
Figure 7B:
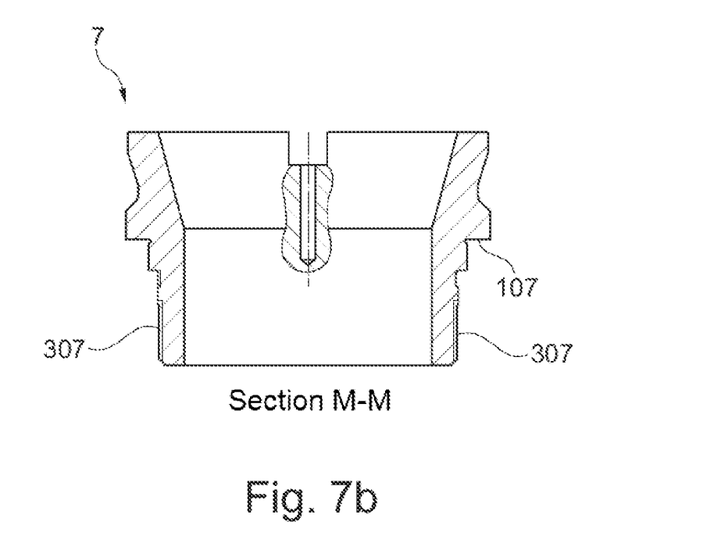

After tightening, the fixing of the bushing element 7 can be further improved by:

drilling bores on the component 6 in correspondence with pilot holes 207 provided on the bushing element 7;

inserting pins in the pilot holes and the bores as drilled to secure the flanged end portion to the intermediate annular surface of the component 6, across the thread between said component 6 and said bushing element 7.

All or part of the pins can be welded.

Figure 8:
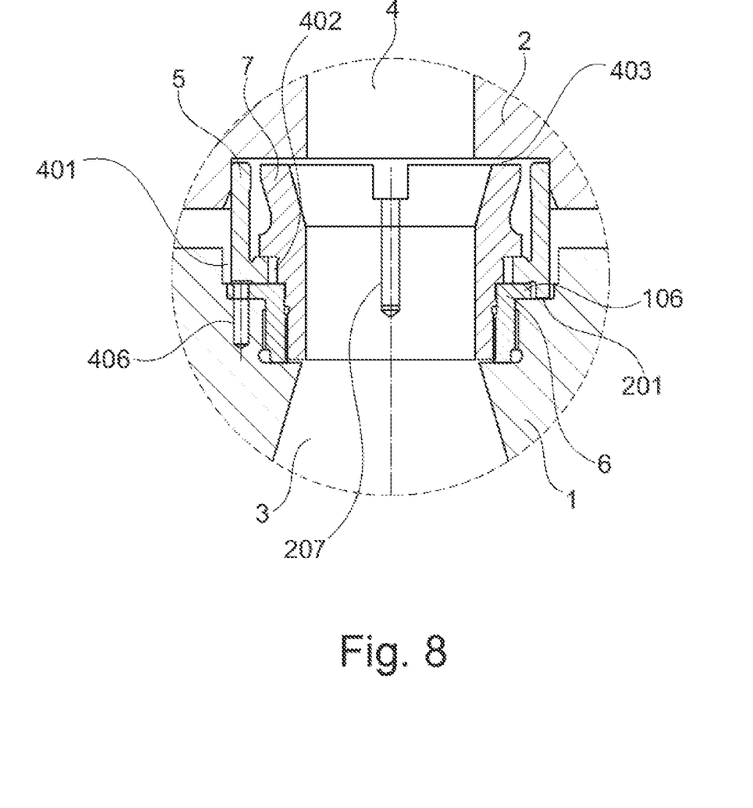
FIG. 8 shows a partial section view of an expansion joint according to a further embodim

The final operation relates to the coupling of the second turbine component to the first turbine component by axially displacing the first and/or the second turbine component to allow the exposed part of the sealing ring to be inserted in the recess of the second turbine component to obtain the assembly as shown in FIG. 8. Care is taken to allow axial clearance 403 between component 2 and the sealing ring 5.

The above description of exemplary embodiments refer to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. The above detailed description does not limit the scope of the claimed invention. Instead, the scope of the invention is defined by the appended claims.

What is claimed is:

1. An expansion joint for sealingly connecting a first and a second turbine component having wall openings coaxial with fluid passages in relative displacement, the openings defining a recess with opposing radial surfaces acting as seat for the joint in the first and the second turbine component, the joint comprising:

a sealing ring adapted to be disposed in the recess such as to axially and radially engage with the recessed surfaces around the fluid passages, an intermediate ring adapted for being interposed between the sealing ring and the radial surface of the first turbine component, wherein the intermediate ring has openings axially engaging with protuberances of the sealing ring to prevent relative rotation; and a bushing element engaged with a lateral wall of the intermediate ring.

2. The expansion joint according to claim 1, wherein the intermediate ring has the shape of a cylinder with a flanged end portion adapted to be positioned on the radial surface of the first turbine component with the lateral wall of the intermediate ring axially aligning with the corresponding fluid passage, the openings being provided in such flanged end portion.

3. The expansion joint according to claim 1, wherein the openings of the intermediate ring are circumferential slots having axial delimiting walls and the protuberances of the sealing ring are circumferential abutting elements having corresponding mating axial lateral surfaces.

4. The expansion joint according to claim 1, wherein the intermediate ring has fixing elements for being secured to the wall of the opening of the first component, the joint expansion being assured by axial and/or radial displacement of the sealing ring on the seats, there being provided a radial clearance between the sealing ring and lateral walls of the first turbine component defining the recess receiving the sealing ring in the first turbine component.

5. The expansion joint according to claim 4, wherein the fixing elements comprises pins to be inserted in pilot holes provided at the periphery of the intermediate ring and/or threads to secure the intermediate ring to first turbine component.

6. The expansion joint according to claim 1, wherein the bushing element has a radial abutting surface acting on an annular surface of the sealing ring such as to exert a retaining function on a terminal portion of the sealing ring towards the intermediate ring.

7. The expansion joint according to claim 1, wherein the engagement of the bushing element with the lateral wall of the intermediate ring forms an abutting conduit in fluid communication with the flow passage, there being provided fixing elements for securing the bushing element to the intermediate ring.

8. The expansion joint according to claim 7, wherein the fixing elements comprise pins to be inserted in pilot holes provided at the periphery of the bushing element to secure the bushing element to the intermediate ring and threads to tighten the bushing element to the intermediate ring.

9. A method for sealingly connecting a first and a second turbine component having wall openings defining recesses coaxial with fluid passages in relative displacement, the recess of the first turbine component having the shape of a cylindrical bore with a circular bottom surface, the recess of the second turbine component having the shape of coaxial cylindrical bores with the internal bore having a diameter less than the diameter of the external bore so as to define a bottom circular surface and an intermediate annular surface, the method comprising the operations of:

tightening a threaded intermediate ring, having a flanged end portion and circumferential openings, on the lateral wall of the internal bore of the second turbine component until the flanged end portion of the intermediate ring is positioned on the intermediate annular surface of the first turbine component;

placing on the flanged end portion a sealing ring having circumferential abutting elements in the axial direction so as to engage with the circumferential openings of the intermediate ring to prevent relative rotation of the sealing ring and the intermediate ring.

10. The method according to claim 9, further comprising tightening a bushing element on the lateral wall of the intermediate ring facing the internal bore to form an abutting conduit in fluid communication with the flow passage of the first turbine component.

11. The method according to claim 10, wherein the operation of tightening the bushing element comprises pushing a radially abutting surface of the bushing element towards an annular surface of the sealing ring to retain the sealing ring towards the flanged end portion of the intermediate ring.

12. The method according to claim 9, further comprising, before placing the sealing ring on the flanged end portion of the intermediate ring:

drilling bores on the intermediate annular surface of the first turbine component in correspondence with pilot holes provided on the flanged end portion of the intermediate ring;

inserting pins in the pilot holes and the bores as drilled to secure the flanged end portion to the intermediate annular surface of the first turbine component;

optionally welding all or part of the pins.

13. The method according to claim 9, further comprising, after tightening the bushing element:

drilling bores on the component in correspondence with pilot holes provided on the bushing element;

inserting pins in the pilot holes and the bores as drilled to secure the bushing element to the intermediate annular surface of the component;

optionally welding all or part of the pins.

14. The method according to claim 9, further comprising coupling the second turbine component to the first turbine component by axially displacing the first and/or the second turbine component to allow the exposed part of the sealing ring to be inserted in the recess of the second turbine component.

* * * * *